V. H. CHRISTEN.
WINDSHIELD WIPER.
APPLICATION FILED FEB. 2, 1920.
1,343,310.
Patented June 15, 1920.
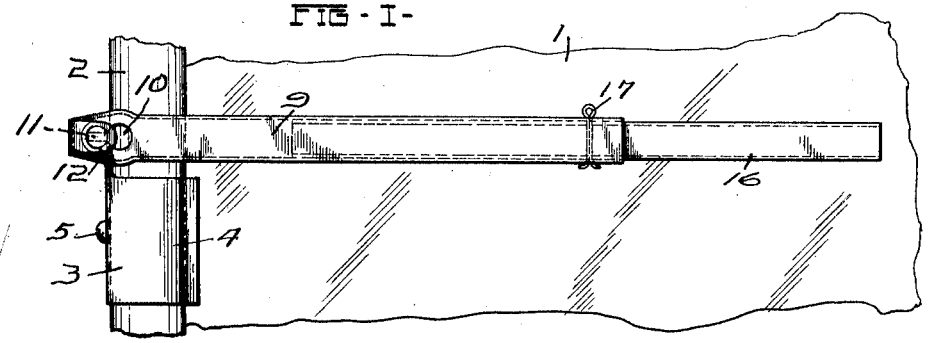
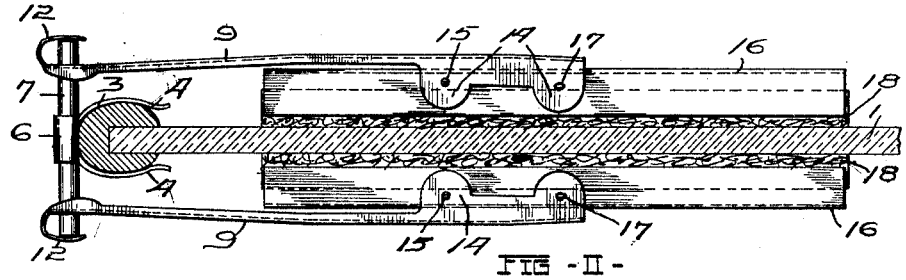
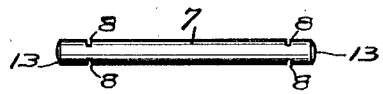
INVENTOR
Victor H. Christen
by
Owen Owen & Crampton

UNITED STATES PATENT OFFICE.

VICTOR H. CHRISTEN, OF TOLEDO, OHIO.

WINDSHIELD-WIPER.

1,343,310.

Specification of Letters Patent.

Patented June 15, 1920.

Application filed February 2, 1920. Serial No. 355,842.

*To all whom it may concern:*

Be it known that I, VICTOR H. CHRISTEN, a citizen of the United States, and a resident of Toledo, in the county of Lucas and State of Ohio, have invented a certain new and useful Windshield-Wiper; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a wind shield wiper that may be readily attached to the wind shield for wiping the surface thereof particularly when it is raining or snowing, to remove the drops that collect on the surface of the glass and which prevent clear vision. It also has for its object other features which will appear from the following description and upon examination of the drawings.

The invention may be contained in structures of different forms. To illustrate a practical application of the invention I have selected one of the structures containing the invention as an example of such structures and shall described it hereinafter.

Figure 1 of the drawings illustrates a front or rear view of the wiper applied to a wind shield and Fig. 2 illustrates a side view of the wiper. Fig. 3 illustrates one of the parts of the wiper.

1, Fig. 1, is the glass of the wind shield which is supported in the frame 2 in the manner well known in the art. The wiper may be supported on any part of the frame or on the glass, but in the preferred form the wiper is supported on the top of the frame 2. A clip or bracket 3 is secured to the frame 2 by means of two spring pressed parts 4 that may conform to the shape of the frame to clamp it at any desired point. The clip 3 may be formed of sheet metal and bent in the form of a U and the legs of the U may be used to clamp the frame at any desired point. The bracket or clip 3 may also be secured by a screw 5 that passes through the clip 3 and into the frame 2. The clip 3 is provided with an ear 6 that extends over the edge or the outer side of the frame 2. It is bent into a semi-circular form and so as to receive and hold a pin 7 against the frame 2. The width of the ear 6 is sufficient to hold the pin 7 in a position substantially at right angles to the plane of the glass 1. If desired, the pin 7 may pass through a hole bored in the frame 2 or it may pass through a hole bored in the glass, as the wiper is so constructed that there will be but little tendency to lateral play relative to the ear 6 or the holes bored in the frame or in the glass. The pin 7 is provided with two pairs of cuts 8 formed near the ends of the pin and forming four flat bottomed channels extending transverse the ends of the pin. The wiper is also provided with spring arms 9 that have openings 10 for receiving the pin 7 and slots 11 communicating with the openings 10 for receiving the portions of the ends of the pin between the channels or cuts 8 and so that when the pin is pushed into the slots 11 the sides of the cuts 8 will engage with the arms 9 and so as to prevent rotation of the arms 9 relative to the pin 7. The spring pressed arms 9 terminate in tongues 12 that are bent over and tightly press against the ends of the pin 7. The ends 13 of the pin 7 are rounded so as to force the ends of the tongues 12 up when the pin is forced under the edge or end of the tongues and the tongues are so formed that they extend in the form of a curve over the opposite sides of the pin 7 and thus the arms are tightly held in their position relative to the pin 7, the shape of the ends of the tongues 12 being such as to prevent longitudinal movement of the arms 9 relative to the pin 7 and thus prevent the pin 7 from entering the openings 10.

The arms 9 are spring arms, but are preferably channel shaped, the depth of the channel, however, being small. They terminate in a plurality of ears 14 having openings 15. The ears 14 are arranged in pairs, the ears of each pair being located on opposite sides of the arms 9. The wipers 16 are located between the ears 14 and have at their centers openings for receiving the pins 17 that may be passed through the openings in the wipers 16 and the openings 15 in corresponding pairs of ears 14. The pin 17 may be a cotter pin which may be readily removed and reinserted and yet which may be nevertheless readily locked in position so as to connect the wipers 16 to the arms 9. This provides for ready adjustment of the wipers relative to the arms 9 inasmuch as the pin 17 may be inserted in any pair of ears 14. The wipers 16 are provided with felt strips 18 which are pressed against the glass 1 by the elasticity of the arms 9. Inasmuch as the pins 17 pass through the centers of the wipers 16 the felt strips 18 will be pressed squarely against the glass along practically their whole length. Any movement of the wipers 16 relative to the arms 9 to thus conform its position to the surface of the glass is guided by the pairs of ears 14. The ears 14 also prevent relative rotative movements about the axis extending the length of the wipers so that the wipers will be pressed squarely against the glass and remove all moisture or other foreign material from the glass.

I claim:

1. In a wind shield wiping means, a pin, a spring arm, the pin having a pair of slots in alinement on opposite sides, the spring arm having an opening for receiving the portion of the pin between the slots, a wiper connected to the arm and means to hold said pin in operative position.

2. In a wind shield wiping means, a pin, a spring arm, the pin having a pair of slots in alinement on opposite sides, the spring arm having an opening for receiving the portion of the pin between the slots, the arm having a tongue bent over the end of the pin to lock the pin in position in the arm, means to hold the said pin in operative position and a wiper connected to the arm.

3. In a wind shield wiping means, a pin having slots located on opposite sides and near the ends of the pin, the pin having convex ends, a pair of spring arms having an opening for receiving the ends of the pins between the slots, the arms having tongues bent over and fitting the ends of the pins and so as to be bent outward against the elasticity of the arms when the pin is forced into the said opening and so as to retain the said pin in the said opening when the pin has been pressed into position in the said openings, and wipers connected to the ends of the arms.

In testimony whereof I have hereunto signed my name to this specification.

VICTOR H. CHRISTEN.